United States Patent
Jurgens

(10) Patent No.: US 10,167,382 B2
(45) Date of Patent: Jan. 1, 2019

(54) SEALING MATERIAL

(71) Applicant: Wolfgang Jurgens, Erkelenz (DE)

(72) Inventor: Wolfgang Jurgens, Erkelenz (DE)

(73) Assignee: ENRICHMENT TECHNOLOGY COMPANY LTD. (DE)

( * ) Notice: Subject to any disclaimer, the term of this patent is extended or adjusted under 35 U.S.C. 154(b) by 637 days.

(21) Appl. No.: 14/597,980

(22) Filed: Jan. 15, 2015

(65) Prior Publication Data
US 2015/0203669 A1 Jul. 23, 2015

(30) Foreign Application Priority Data

Jan. 20, 2014 (EP) .................................... 14151702

(51) Int. Cl.
| | | |
|---|---|---|
| C08L 9/00 | (2006.01) | |
| C08K 5/09 | (2006.01) | |
| C08K 5/14 | (2006.01) | |
| C08K 5/3415 | (2006.01) | |
| F04D 19/04 | (2006.01) | |
| F04D 29/02 | (2006.01) | |
| F04D 29/08 | (2006.01) | |
| B29C 41/20 | (2006.01) | |
| F16J 15/02 | (2006.01) | |
| F16J 15/10 | (2006.01) | |
| C08K 3/04 | (2006.01) | |
| C08K 3/22 | (2006.01) | |
| C08K 3/013 | (2018.01) | |
| B29K 19/00 | (2006.01) | |
| B29L 31/26 | (2006.01) | |

(52) U.S. Cl.
CPC ................ C08L 9/00 (2013.01); B29C 41/20 (2013.01); C08K 3/013 (2018.01); C08K 3/04 (2013.01); C08K 3/22 (2013.01); C08K 5/09 (2013.01); C08K 5/14 (2013.01); C08K 5/3415 (2013.01); F04D 19/04 (2013.01); F04D 29/023 (2013.01); F04D 29/083 (2013.01); F16J 15/022 (2013.01); F16J 15/102 (2013.01); *B29K 2019/00* (2013.01); *B29L 2031/26* (2013.01); *C08K 2003/222* (2013.01); *F05D 2300/224* (2013.01); *F05D 2300/43* (2013.01); *F05D 2300/603* (2013.01); *F05D 2300/615* (2013.01)

(58) Field of Classification Search
CPC ........................................................ C08L 9/00
See application file for complete search history.

(56) References Cited

U.S. PATENT DOCUMENTS

| | | | |
|---|---|---|---|
| 4,098,670 A * | 7/1978 | Custer ....................... | C25B 9/08 |
| | | | 204/242 |
| 5,157,081 A | 10/1992 | Puydak et al. | |
| 2017/0296757 A1* | 10/2017 | Maeda ................ | A61M 5/3202 |

FOREIGN PATENT DOCUMENTS

| | | |
|---|---|---|
| GB | 1533181 | 11/1978 |
| WO | WO 03/078538 A1 | 9/2003 |

OTHER PUBLICATIONS

European Search Report for corresponding EP 14151702.9, dated Apr. 10, 2014.
Dutta, et al.: "Influence of curing systems on the properties of bromobutyl rubber: Part III—Effect of different types of curing systems on the cure characteristics, physical properties and thermo-oxidative degradation characteristics." Polymer degradation and stability 36.1 (1992): 73-80.

* cited by examiner

*Primary Examiner* — Kuo Liang Peng
(74) *Attorney, Agent, or Firm* — Tarolli, Sundheim, Covell & Tummino LLP

(57) ABSTRACT

The invention relates to a sealing material, to a gas seal made of this sealing material, and to a method for the production of such a gas seal made of this sealing material. The sealing material contains a bromobutyl elastomer in an amount of 100 parts by weight, a filler material in an amount between 10 and 100 parts by weight for setting the volume of the sealing material, a curing agent in an amount between 0.5 and 3.0 parts by weight for curing the sealing material, and a cross-linking component in an amount between 0.1 and 2.0 parts by weight for bringing about a peroxidic cross-linking of the sealing material. This sealing material permits a particularly high vacuum-tightness (that is to say, a low leakage rate) in comparison to sealing materials according to the state of the art, and accounts for resistance, on the one hand, to aggressive gases and, on the other hand, to pump oils such as, for instance, perfluoropolyethene oil or silicon oil.

19 Claims, 2 Drawing Sheets

SEALING MATERIAL

RELATED APPLICATIONS

This application claims priority from European Patent Application Serial No. 14151702.9, filed 20 Jan. 2014, which is incorporated herein in its entirety.

FIELD OF THE INVENTION

The invention relates to a sealing material, to a gas seal made of this sealing material, and to a method for the production of such a gas seal made of this sealing material.

BACKGROUND OF THE INVENTION

Sealing materials are used to seal a volume vis-à-vis another volume. Here, the seals can serve, for example, to keep out noxious gases or else as a vacuum seal in order to create or maintain a vacuum. Depending on the application, very different and, at times, high demands are made of such sealing materials, for example, when it comes to achieving good resistance to aggressive gases or a low permeation rate, for instance, for water, helium, nitrogen or oxygen (e.g. electric switching elements). Other important properties of seals are their resistance to the operating temperatures, resistance to oils, ultimate tensile strength, rupture strength, compression set resistance, outgassing behavior in a vacuum or their vacuum leakage rate.

Nowadays, no inexpensive sealing material is available that can satisfy all of the above-mentioned applications equally well. Different seals made of different sealing materials are used for the individual applications, depending on the requirements in question. Sometimes, metal seals in the form of disposable seals have to be used for this purpose. Consequently, different seals have to be kept on hand for various technical systems. It would be desirable if one single sealing material were available with which seals could be made that would meet a wide array of different requirements equally well. It would also be desirable if seals made of this sealing material were reusable in order to reduce material consumption.

SUMMARY OF THE INVENTION

It is one objective of the present invention to put forward a sealing material that is capable of meeting a wide array of requirements that have to be met by seals made of this material, especially a gas seal. Another objective of the invention is the production and provision of such a (gas) seal.

This objective is achieved by a sealing material for the production of a gas seal, preferably a vacuum seal, whereby the constituents of the sealing material include a bromobutyl elastomer in an amount of 100 parts by weight, a filler material in an amount between 10 and 100 parts by weight for setting the volume of the sealing material, a curing agent in an amount between 0.5 and 3.0 parts by weight for curing the sealing material, and a cross-linking component in an amount between 0.1 and 2.0 parts by weight for bringing about a peroxidic cross-linking of the sealing material in order to attain the desired gas-tightness.

In this context, the term "amount" refers to the relative volume ratios of the individual constituents with respect to each other, in relation to the appertaining weight of the individual constituents as such. The absolute total weight of a sealing material produced in this way depends on the application case in question. For example, within the scope of the present invention, a sealing material could contain 100 g of bromobutyl rubber as the bromobutyl elastomer, 45 g of filler material, 2 g of curing agent and 1 g of cross-linking component.

The main component of seals, especially gas seals, is an elastomer for achieving the sealing effect on the basis of the pressure exerted on the seal between the individual sealing surfaces. The bromobutyl rubber according to the invention, as the elastomer (bromobutyl elastomer) employed, permits a particularly high vacuum-tightness (that is to say, a low leakage rate) in comparison to sealing materials according to the state of the art, and accounts for resistance, on the one hand, to aggressive gases and, on the other hand, to pump oils such as, for instance, perfluoropolyethene oil or silicon oil. The filler material, for example, black carbon, does not itself bring about these properties, but in an advantageous manner, as a filling material, it creates processable a volume of the sealing material. The curing agent, for example, an organic peroxide, in combination with a suitable cross-linking component, permits a uniform and well-shaped curing of the sealing material, whereby this cross-linking component can bring about a sulfurous cross-linking or a peroxidic cross-linking. The cross-linking component, for example, a dimaleimide, serves as a multi-functional reagent for peroxidically cross-linked elastomers. The above-mentioned material properties of the sealing material according to the invention are attained through the interaction of the elastomer, the filler material, the curing agent and the cross-linking component.

The sealing material according to the invention is capable of meeting a wide array of different requirements that have to be met by seals made of this material such as, for example, a good resistance to aggressive gases, a low permeation rate, for example, for water, helium, nitrogen or oxygen (e.g. electric switching elements), a good resistance to the operating temperatures or to oils (pump oils), good ultimate tensile strength, rupture strength, compression set resistance, a slight to negligible outgassing behavior in a vacuum, and a very low vacuum leakage rate.

In one embodiment, the sealing material contains a plasticizer in an amount of less than 3 parts by weight, preferably between 0.3 and 1.5 parts by weight, which serves to improve the processing properties of the sealing material. The more plasticizer there is in the sealing material within the scope of the present invention, the softer the finished sealing material after it has been made into the desired shape and cured. However, the plasticizer amount should not be greater than necessary since the plasticizer can dissolve out during the later use of the sealing material in a gas seal. This is especially disadvantageous in the case of vacuum seals since, in this way, molecules evaporate out of the sealing material into the vacuum and the achieved final vacuum deteriorates, at least for a time period that is dependent on the pump capacity. Furthermore, the plasticizer can react chemically or can precipitate in an undesired manner inside the evacuated area. Plasticizers are preferably saturated carboxylic acids or fatty acids. An example of a suitable plasticizer is stearic acid.

In one embodiment, the sealing material contains, as an additional constituent, a material for acid neutralization in an amount of less than 5.0 parts by weight, preferably between 0.5 and 3.0 parts by weight. The material used for acid neutralization is an acid receptor for halogenated polymers. In this material, the neutralization effect is brought about, for example, by activated MgO that is embedded in an organic binder. The binder protects the MgO from absorbing moisture and thus from prematurely being converted into $Mg(OH)_2$. An example of a suitable material for acid neutralization is Maglite DE.

In one embodiment, the sealing material contains, as an additional constituent, an antioxidant material in an amount of less than 5.0 parts by weight, preferably between 0.5 and 3.0 parts by weight. This antioxidant material can be used to chemically passivate reactive constituents of the sealing material or of compounds that reach the sealing material from the environment of the gas seal, so that the cross-linking of the sealing material is not detrimentally affected. This is particularly advantageous as protection against harmful oxidation reactions. An example of a suitable antioxidant material is Vulkanox MB2/MG.

In one embodiment, the filling material is chemically inert, so that the material properties of the sealing material that were previously set by the other constituents cannot be negatively affected. In one embodiment, the filler material is Statex N550. In a preferred embodiment, the filler material is black carbon. In another preferred embodiment, the amount of filler material in the sealing material is between 70 and 100 parts by weight. At this amount of filler material, the degree of hardness of the sealing material is higher and so is the hardness of the gas seal that is later made of this sealing material. If there is a smaller amount of filler material, softer gas seals can be made of the sealing material.

The invention also relates to a gas seal made of a sealing material according to the invention. The gas seal according to the invention is capable of meeting a wide array of requirements such as, for example, a good resistance to aggressive gases, a low permeation rate, for instance, for water, helium, nitrogen or oxygen (e.g. electric switching elements), a good resistance to the operating temperatures or to oils (pump oils), a good ultimate tensile strength, rupture strength, compression set resistance, a slight to negligible outgassing behavior in a vacuum, and a very low vacuum leakage rate.

In one embodiment, the gas seal is configured as an O-ring seal. O-rings are ring-shaped sealing elements, whereby the shape can also differ from a circular shape. For instance, O-rings can also be elliptical. Thanks to the relatively simple shape of O-rings, they are easy to manufacture on an industrial scale. Preferably, injection molding is used, but compression molding can also be employed to manufacture O-rings in case of small production runs. Due to its circular cross section, an O-ring can seal axially and/or radially. The initial tightness is effectuated by the compression of the rubber element during the installation (in the radial and/or in the axial direction). The sealing compression is a function of the superimposition of the pre-compression (owing to the installation) and of the system pressure that is to be sealed. Therefore, the sealing pressure that prevails in the sealing joint is higher by the magnitude of the pre-compression than the pressure that is to be sealed. Consequently, very high pressures can be sealed. O-rings are normally made in various standard sizes.

In one embodiment, the gas seal is configured as a metal-elastomer composite seal with a suitably shaped metal core encapsulated by the sealing material. An example of the metal that can be used here is copper. In this context, the term composite seal refers to a seal where the metal core is encapsulated by the sealing compound, but it does not mean a mixed material made of sealing material with metal fractions. Such a composite seal can withstand greater flange pressures (pressure of the sealing surfaces onto the seal) than a seal without a metal core. Here, the shape of the metal core is adapted to the shape of the later gas seal. For example, the metal core can be shaped as a flat ring or, in the case of an O-ring seal, as a metal ring whose cross section is smaller than the cross section of the later gas seal, for example, the later O-ring. Such composite seals have a lower leakage rate than gas seals made only of the sealing material according to the invention and, in contrast to pure metal seals, they can be reused.

In one embodiment, the gas seal according to the invention can be used as a vacuum seal. In a preferred embodiment, the constituents of the sealing material are selected in such a way that the gas seal has a leakage rate of less than $10^{-9}$ mbar*L/s. In one embodiment of the sealing compound according to the invention for a gas seal having a leakage rate of less than $10^{-9}$ mbar*L/s, the sealing compound contains bromobutyl rubber at 100 parts by weight as the elastomer, the filler material at 45±4.0 parts by weight (for example, Statex N550 as the filler material), the material for acid neutralization (acid neutralizer) at 1.0±0.2 parts by weight (for example, Maglite DE as the acid neutralizer), the plasticizer at 1.0±0.2 parts by weight (for example, stearic acid as the plasticizer), the antioxidant material at 1.0±0.2 parts by weight (for example, Vulkanox MB2/MG as the antioxidant material), the curing agent at 2.0±0.3 parts by weight (for example, Perkadox BC-40B-PD as the curing agent), the cross-linking component at 1.0±0.2 parts by weight (for example, N,N'-m-phenylene dimaleimide as the cross-linking component) and optionally, polyethylene glycol at 1.5±0.3 parts by weight (for example, PEG 4000). In one embodiment, this sealing material is used in a metal-elastomer composite seal.

Thus, the gas seal made of the sealing material according to the invention for rubber seals has excellent sealing properties that could otherwise only be achieved with expensive metal seals (copper seals) that can only be used one time. In comparison to metal seals, the gas seal according to the invention is an inexpensive and reliable alternative that, in addition, is reusable, so that the vacuum system can be quickly opened and closed again without a need to replace the gas seal.

The invention also relates to a method for the production of a gas seal according to the invention, comprising the following steps:

providing a sealing material containing a bromobutyl elastomer in an amount of 100 parts by weight, a filler material in an amount between 10 and 100 parts by weight for setting the volume of the sealing material, a curing agent in an amount between 0.5 and 3.0 parts by weight for curing the sealing material, and a cross-linking component in an amount between 0.1 and 2.0 parts by weight for bringing about a peroxidic cross-linking of the sealing material in order to attain the desired gas-tightness, shaping the gas seal made of the sealing material; and curing the sealing material of the shaped gas seal at a suitable curing temperature and for a suitable curing time in order to produce the gas seal.

The gas seal (gas-tight seal) can be shaped, for example, by means of a compression procedure in an appropriate machine. Here, known and commercially available machines and methods can be used to produce gas seals, for example, sealing rings. The terms "suitable curing temperature" and "suitable curing time" are interrelated. The higher the curing temperature is, the shorter the curing time can be. Conversely, a gas seal made of the sealing material according to the invention requires a longer curing time at a lower curing temperature. For example, the curing temperature for a curing time between 4 and 7 minutes could be between 90°

C. and 110° C. In another embodiment, for example, the curing temperature for a curing time between 1 and 2 minutes could be between 170° C. and 200° C.

In one embodiment, the method also comprises the step of setting the available time interval for processing the sealing material to form a gas seal, which is done by adjusting the amount of plasticizer.

In one embodiment, the step of shaping the gas seal comprises the step of encapsulating a suitably shaped metal core with the sealing material in order to produce a metal-elastomer composite seal. Here, the core is preferably completely encapsulated.

BRIEF DESCRIPTION OF THE FIGURES

These and other aspects of the invention are shown in detail in the figures as follows.

DETAILED DESCRIPTION OF THE EMBODIMENTS

Figure 1:
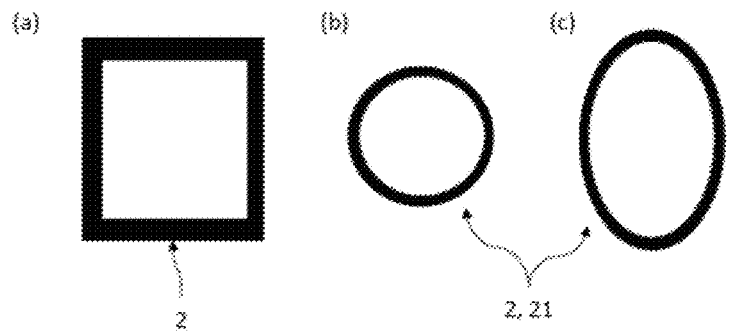
FIG. 1 various embodiments (a) to (c) of a gas seal according to the invention.

FIG. 1 shows three embodiments (a) to (c) of a gas seal 2 according to the invention, whereby the gas seal 2 can have various geometric shapes. For example, in a top view, the gas seal 2 can have (a) a rectangular shape, (b) a more or less round shape, and (c) an oval or elliptical shape. The cross sections (not shown here) of the gas seals 2 can vary, for example, as a round or rectangular cross section, as a function of the specific application purpose. The cross section can also have a different shape that is adapted to the sealing surfaces in question. Irrespective of the shape, the gas seal 2 according to the invention is capable of meeting a wide array of requirements such as, for example, a good resistance to aggressive gases, a low permeation rate, for example, for water, helium, nitrogen or oxygen (e.g. electric switching elements), a good resistance to the operating temperatures or to oils (pump oils), good ultimate tensile strength, rupture strength, compression set resistance, a slight to negligible outgassing behavior in a vacuum, and a very low vacuum leakage rate. In one embodiment, the gas seal 2 is configured as an O-ring seal 21. O-rings 21 are ring-shaped sealing elements, whereby the shape can also differ from a circular shape, see FIGS. 1b and 1c.

Figure 2:
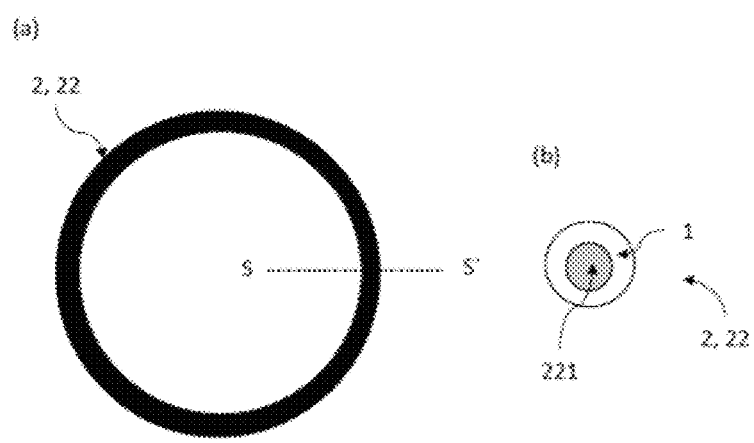
FIG. 2 an embodiment of a metal-elastomer composite seal (a) in a top view and (b) in a side view.

FIG. 2 shows an embodiment of a metal-elastomer composite seal 22 according to the invention (a) in a top view and (b) in a side view along the sectional plane S-S'. Here, the metal-elastomer composite seal 22 is configured with a suitably shaped metal core 221 that is encapsulated with the sealing material 1. In this embodiment, the cross section of the metal-elastomer composite seal 22 is circular, whereby the metal core 221 likewise has a circular cross section. In other applications, the cross section of the metal-elastomer composite seal 22 can also be rectangular or can have some other shape. Accordingly, the metal core 221 can likewise be rectangular or have some other cross section. In this embodiment, the metal core 221 is also completely encapsulated by the sealing material 1. In other embodiments, the metal core 221 could also be only partially encapsulated by the sealing material 1.

Figure 3:
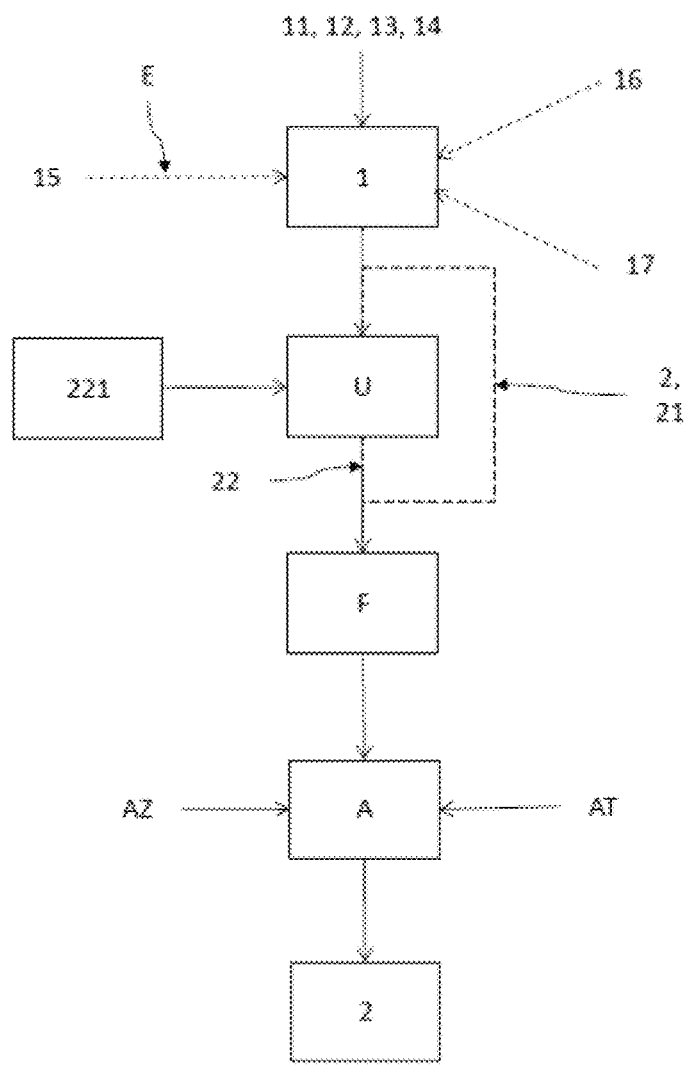
FIG. 3 an example of the production of a gas seal according to the invention.

FIG. 3 shows an example of the production of a gas seal 2 according to the invention. For the production of the gas seal 2, first of all, the sealing material 1 is prepared which, in this embodiment, contains at least a bromobutyl elastomer 11 in an amount of 100 parts by weight, a filler material 12 in an amount between 10 and 100 parts by weight for setting the volume of the sealing material 1, a curing agent 13 in an amount between 0.5 and 3.0 parts by weight for curing the sealing material 1, and a cross-linking component 14 in an amount between 0.1 and 2.0 parts by weight for bringing about a peroxidic cross-linking of the sealing material 1 in order to attain the desired gas-tightness. Optionally, the available time interval for processing the sealing material 1 to form a gas seal can be set E by adjusting the amount of plasticizer 15. For this purpose, the plasticizer 15 is present in an amount that is less than 3 parts by weight, preferably between 0.3 and 1.5 parts by weight. Moreover, as an additional constituent, a material for acid neutralization 16 in an amount of less than 5.0 parts by weight, preferably between 0.5 and 3.0 parts by weight, can be added to the sealing material 1, and/or an antioxidant material 17 in an amount of less than 5.0 parts by weight, preferably between 0.5 and 3.0 parts by weight, can be added to the sealing material 1. The optional components 15, 16, 17 of the sealing material according to the invention are shown by broken-line arrows. Moreover, polyethylene glycol at 1.5±0.3 parts by weight can also be optionally still added (not shown here). Once the sealing material 1 is present in the desired composition, the gas seal 2 is shaped F using the sealing material 1. In this process, depending on the embodiment of the gas seal 2, the step of shaping F the gas seal 2 can also comprise the step of encapsulating U a suitably shaped metal core 221 with the sealing material 1 in order to produce a metal-elastomer composite seal 22, whereby first of all, the metal core 221 is encapsulated with sealing material 1 and subsequently, the gas seal 2 is finally shaped F. The shaping F of the gas seal 2 (gas-tight seal 2) can be carried out, for example, by a compression procedure in an appropriate machine. Here, known and commercially available machines and methods can be employed to produce gas seals 2, for example, sealing rings. The subsequent curing A of the sealing material 1 of the shaped gas seal 2 is carried out at a suitable curing temperature AT and for a suitable curing time AZ. The curing temperature AT and the curing time AZ are interrelated. The higher the curing temperature AT is, the shorter the curing time AZ can be. Conversely, a gas seal 2 made of the sealing material 1 according to the invention requires a longer curing time AZ at a lower curing temperature AT. For example, the curing temperature AT for a curing time AZ between 4 and 7 minutes could be between 90° C. and 110° C. In another embodiment, for example, the curing temperature AT for a curing time AZ between 1 and 2 minutes could be between 170° C. and 200° C.

The embodiments shown here are only examples of the present invention and therefore must not be construed in a limiting manner. Alternative embodiments taken into consideration by the person skilled in the art are likewise encompassed by the scope of protection of the present invention.

LIST OF REFERENCE NUMERALS 1 sealing material according to the invention
11 bromobutyl elastomer (bromobutyl rubber)
12 filler material
13 curing agent
14 cross-linking component
15 plasticizer
16 material for acid neutralization (acid neutralizer)

17 antioxidant material
2 gas seal
21 O-ring seal
22 metal-elastomer composite seal
221 metal core
A curing the sealing material
AT curing temperature
AZ curing time
E setting the available time interval for processing the sealing material
F shaping the gas seal
S,S' sectional plane in FIG. 2
U encapsulating the metal core with sealing material

The invention claimed is:

1. A sealing material for the production of a gas seal, wherein the constituents of the sealing material include a bromobutyl elastomer in an amount of 100 parts by weight, a filler material in an amount between 10 and 100 parts by weight for setting the volume of the sealing material, a curing agent of a peroxide in an amount between 0.5 and 3.0 parts by weight for curing the sealing material, a material for acid neutralization, and a cross-linking component serving as a multi-functional reagent for peroxidically cross-linked elastomers in an amount between 0.1 and 2.0 parts by weight for further enhancing gas-tightness of the peroxidically cross-linked sealing material, wherein the material for acid neutralization consists essentially of an organic binder and activated magnesium oxide (MgO) embedded in the organic binder.

2. The sealing material according to claim 1, characterized in that
the sealing material contains, as an additional constituent, a plasticizer in an amount of less than 3 parts by weight, which serves to improve the processing properties of the sealing material.

3. The sealing material according to claim 2, characterized in that the sealing material contains the plasticizer in an amount of between 0.3 and 1.5 parts by weight.

4. The sealing material according to one of claim 1, characterized in that
the sealing material contains the activated MgO embedded in an organic binder in an amount of less than 5.0 parts by weight.

5. The sealing material according to one of claim 4, characterized in that
the sealing material contains the activated MgO embedded in an organic binder in an amount of between 0.5 and 3.0 parts by weight.

6. The sealing material according to claim 1, characterized in that,
the sealing material contains, as an additional constituent, an antioxidant material in an amount of less than 5.0 parts by weight.

7. The sealing material according to claim 6, characterized in that,
the sealing material contains the antioxidant material in an amount between 0.5 and 3.0 parts by weight.

8. The sealing material according to claim 1, characterized in that
the filling material is chemically inert.

9. The sealing material according to claim 8, characterized in that
the amount of filler material in the sealing material is between 70 and 100 parts by weight.

10. The sealing material according to claim 8, characterized in that,
the filling material is carbon black.

11. A gas seal made of a sealing material according to claim 1.

12. The gas seal according to claim 11, characterized in that
the gas seal is configured as an O-ring seal.

13. The gas seal according to claim 11, characterized in that
the gas seal is configured as a metal-elastomer composite seal with a shaped metal core encapsulated by the sealing material.

14. The gas seal according to claim 11, characterized in that
the gas seal is used as a vacuum seal.

15. The gas seal according to claim 14, characterized in that
the constituents of the sealing material are selected in such a way that the gas seal has a leakage rate of less than $10^{-9}$ mbar*L/s.

16. The method for the production of a gas seal according to claim 11, comprising the following steps:
providing a sealing material containing a bromobutyl elastomer in an amount of 100 parts by weight, a filler material in an amount between 10 and 100 parts by weight for setting the volume of the sealing material, a curing agent of a peroxide in an amount between 0.5 and 3.0 parts by weight for curing the sealing material, activated magnesium oxide (MgO) embedded in an organic binder for acid neutralization in an amount of less than 5.0 parts by weight, and a cross-linking component serving as a multi-functional reagent for peroxidically cross-linked elastomers in an amount between 0.1 and 2.0 parts by weight for further enhancing gas-tightness of the peroxidically cross-linked sealing material,
shaping the gas seal made of the sealing material; and
curing the sealing material of the shaped gas seal at an interrelated combination of curing temperature and curing time in order to produce the gas seal.

17. The method according to claim 16, also comprising the step of setting the available time interval for processing the sealing material to form a gas seal, which is done by adjusting the amount of plasticizer.

18. The method according to claim 16, also comprising the step of shaping the gas seal, and comprising the step of encapsulating a metal core, whereby the shape of the metal core is adapted to the shape of the gas seal, with the sealing material in order to produce a metal-elastomer composite seal.

19. The sealing material according to claim 1, characterized in that it is used for the production of a vacuum seal.

* * * * *